United States Patent [19]
Aoki et al.

[11] 3,953,185
[45] Apr. 27, 1976

[54] METHOD FOR MAKING VITREOUS FIBERS HAVING SMALL PROTRUSIONS

[75] Inventors: Susumu Aoki, Yokohama; Toshiaki Minaki, Yama; Kentaro Mori, Tokyo; Kenichi Shibata, Nara, all of Japan

[73] Assignee: Nippon Asbestos Co., Ltd., Tokyo, Japan

[22] Filed: July 10, 1975

[21] Appl. No.: 594,867

Related U.S. Application Data
[62] Division of Ser. No. 427,113, Dec. 21, 1973.

[30] Foreign Application Priority Data
Dec. 25, 1972 Japan .................................. 47-2204

[52] U.S. Cl. ............................................ 65/8; 65/9; 65/15; 264/167; 428/372; 428/399
[51] Int. Cl.² ........................................ C03B 37/04
[58] Field of Search ............ 161/174, 179; 264/167; 65/1, 2, 4 R, 3 R, 6, 7, 8, 9, 105; 428/372, 399, 369, 400

[56] References Cited
UNITED STATES PATENTS

| | | | |
|---|---|---|---|
| 2,150,945 | 3/1939 | Slayter | 65/8 |
| 2,215,150 | 9/1940 | Hannen | 161/174 X |
| 2,612,679 | 10/1952 | Ladisch | 161/174 |
| 3,377,233 | 4/1968 | Jackson | 161/174 |
| 3,684,474 | 8/1972 | Chisholm | 65/105 |
| 3,830,638 | 8/1974 | Jumentier et al. | 65/14 |

*Primary Examiner*—Robert L. Lindsay, Jr.
*Attorney, Agent, or Firm*—Hammond & Littell

[57] ABSTRACT

This invention pertains to a method of making inorganic vitreous fibers having small protrusions, such that the fiber produces a high strength reinforced molded product. The fibers are formed by introducing high melting constituents such as glass fiber, rock wool, ceramic fiber, silica particles, alumina particles, zirconia particles or mullite particles to molten inorganic material such that the constituents when flung from a ratary device are incorporated into the molten inorganic material.

7 Claims, 10 Drawing Figures

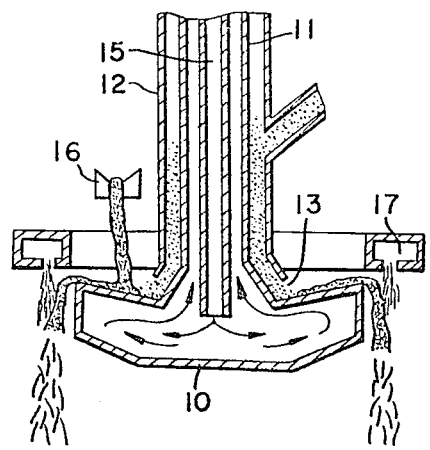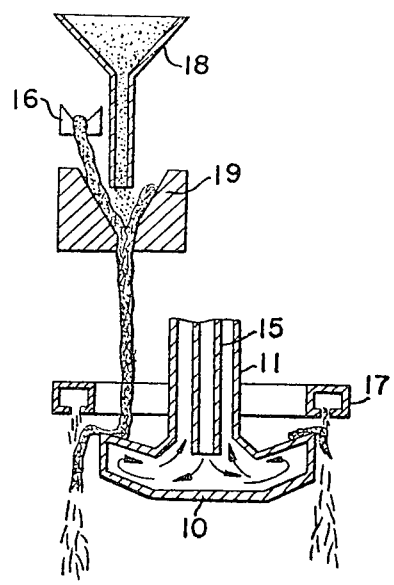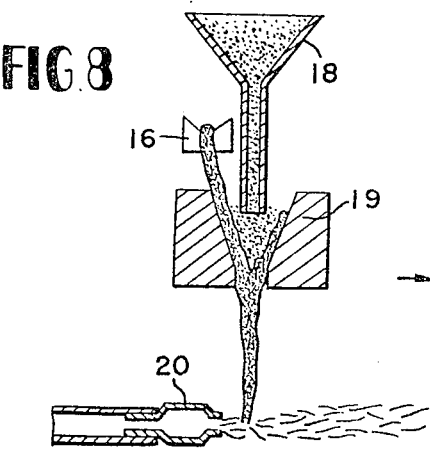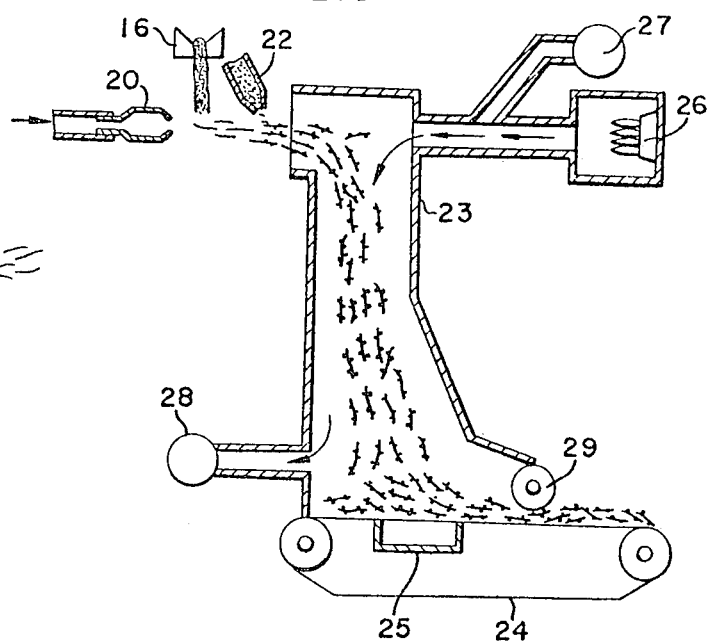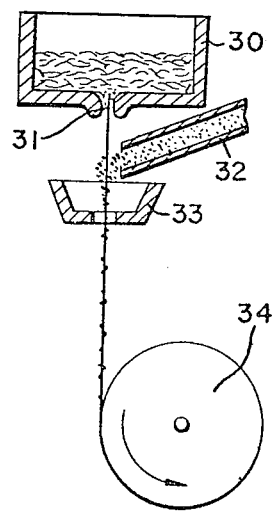

METHOD FOR MAKING VITREOUS FIBERS HAVING SMALL PROTRUSIONS

This is a division of Ser. No. 427,113, filed Dec. 21, 1973.

This invention relates to improvements in or relating to vitreous fibers, and more particularly to vitreous fibers adapted to be used as a reinforcing material of various building materials such as slates, pearlite boards or calcium silicate boards.

Heretofore, asbestos fibers have usually been used as a reinforcing material of such products as slates, pearlite boards and calcium silicate boards. However, since recently the asbestos fibers are increasing in price with the decrease in output of raw material and the quality of asbestos fibers is significantly lowered, it pollutes the air due to the scattering of fiber dust during the defibering step thereof. From the viewpoint of the above, the development of new fibers which can take place of asbestos fibers has been strongly demanded.

As substitutes for asbestos fibers, the use of vitreous fibers such as glass fibers, rock wools and ceramic fibers has been suggested. However, there are many problems in the practical use of these vitreous fibers. This is because, on one hand, they are lacking in chemical durability against materials to be combined, while on the other hand, they lack in surface activity and their surfaces are smooth that makes them poor in physical bonding to the materials to be combined so as to cause "sliding" at their interface when a stress is applied to the product, thus since the stress is positively positiveely transmitted to the fibers, they do not sufficiently serve as a reinforcing material.

It is therefore a general object of the present invention to provide improved vitreous fibers without having disadvantages in the prior art mentioned above.

It is another object of the present invention to provide novel vitreous fibers to be used as a reinforcing material of the building material such as slates, pearlite boards and calcium cilicate boards.

According to the present invention, the above objects are attained by the novel vitreous fibers having tubercular, granular or branch like projections on their surfaces.

It is a further object of the present invention to provide the process for making the vitreous fibers mentioned above.

Many other features, advantages and additional objects of the present invention will become more apparent as the description proceeds, when considered with the accompanying drawings in which:

FIGS. 6 – 10 respectively show schematic sectional view of various apparatus for preparing the reinforcing vitreous fibers according to the present invention.

Figure 1:
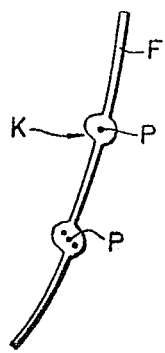
FIG. 1 illustrates an enlarged schematic view of one of vitreous fibers with projections according to the present invention.

Referring to FIG. 1 of the attached drawings, there is shown a vitreous fiber consisting of a body portion of fiber F and one or a number of powder particles P which are contained sporadically in the body portion, whereby the fiber having has increased diameter portions, i.e. tubercular projections K can be formed.

Figure 2:
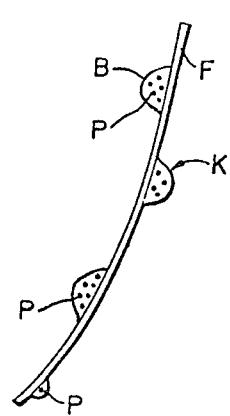
FIG. 2 is a view similar to FIG. 1 illustrating another form of vitreous fibers with projections according to the present invention.

In FIG. 2 of the drawings, the fiber according to the present invention consists of a body portion of the vitreous fiber F and a single or plurality of particles P which are attached to the body portion with binder B so as to form projections K.

Figure 3:
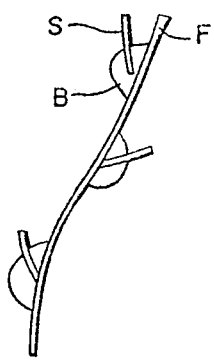
FIG. 3 is a view similar to FIG. 1 illustrating one embodiment of vitreous fibers with branch like projections to the present invention.

In FIG. 3 of the drawings, the fiber according to the present invention consists of a body portion of the vitreous fiber F and a plurality of very short fibers S which are bounded to the body portion with binder B.

Figure 4:
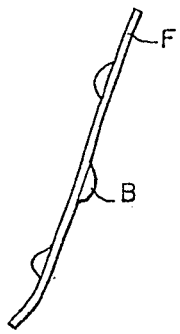
FIG. 4 is a view similar to FIG. 1 illustrating one of vitreous fibers with projections according to the present invention.

In the fiber according to the present invention shown in FIG. 4, binder B in the form of the projection is attached to the body of the fiber filament F.

Figure 5:
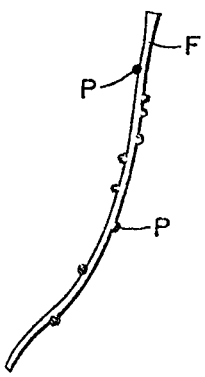
FIG. 5 is a view similar to FIG. 1 illustrating other embodiment of vitreous fibers with projections according to the present invention.

FIG. 5 shows powder particles P projecting from fiber body 3.

The reinforcing vitreous fibers provided with projections on their surfaces according to the present invention can be formed through various methods as will be described hereinbelow with reference to the accompanying drawings.

Referring to FIG. 6 of the drawings, a schematic vertical elevation shows portions of one embodiment of an apparatus for preparing the reinforcing vitreous fibers according to the present invention. In FIG. 6, the numeral 10 indicates a rotor in the form of a hollow disc which is rotated at a high speed by a hollow rotary shaft 11 mounted at the center of the rotor 1D. The hollow shaft 11 is surrounded with a guide cylinder 12 having a divergent lower end and which guide cylinder 12 is so mounted as to provide an annular space 13 between the divergent end and the top surface of the rotor 10. A powder inlet 14 is spaced out from a part of the guide cylinder 12 and hollow rotary shaft 11 is provided therein with a cooling pipe 15 for supplying a coolant to the hollow rotor 10.

A trough-like feeding member 16 is disposed at a position above the rotor 10 to feed a molten material of vitreous fibers toward the top surface of the rotor, so that the molten material leaving the trough-like feeding member 16 falls onto the top surface of the rotor near the annular space 13. The rotor 10 is concentrically provided at its outer side with a ring-shape projection 17 to project a hot gas from its downwardly directed outlets.

With an apparatus arranged as described hereinbefore, the rotor 10 is rotated at a such a high speed as 1,000 - 3,000 r.p.m. and when a molten material is fed continuously from the feeding member 16 to the top surface of the rotor 10, the molten material is spread in the form of film and is flung from the surface by the action of the centrifugal force. When it is flung from the surface, it is subjected to the hot gas projected from the outlets 17 as to form fibers. During this fiber-forming operation, when powder is fed to the top surface of the rotor 10 through the guide cylinder 12 and the annular space 13, it is successively mixed with the molten material and as shown in FIG. 1, single or plurality of the powder particles P are contained sporadically in each fiber according to the mixing rate of the powder to the molten material, whereby fibers respectively having increased diameter portions, i.e. tubercular projections K can be formed.

The powder P to be mixed with the molten material is preferably a heat and corrosion resistant mineral powder of such a material as silica, alumina, zirconia and mullite. The diameter of particles depends upon the diameter of fibers and preferably each fiber contains at least one particle having a diameter 1-2 times larger than the diameter of the fiber. in the above-described apparatus, if a screw conveyor is provided with a heater so as to mix preheated powder with the molten material, a more efficient mixing effect may be provided. As means for feeding the powder to the guide cylinder, any suitable means such as a screw conveyor or a vibration hopper may be employed.

Since the rotor in the apparatus shown in FIG. 6 is subjected to a high temperature of the molten material during the fiber forming, the rotor may be cooled by a coolant fed through the cooling pipe 15. However, such cooling means may be omitted if the rotor is formed of a heat and corrosion resistant material such as a special heat resistant alloy containing cobalt or a platinum alloy.

EXAMPLE I

An example for producing vitreous fibers having tubercular projection by using the apparatus shown in FIG. 6 is described hereinbelow.

A vitreous molten material having a composition of 53% of $SiO_2$, 2% of $Al_2O_3$, 13% of $B_2O_3$, 16% of $Na_2O$, 14% of CaO and 2% of $MgO_2$ and heated to 1200°C was fed into the rotor of the apparatus shown in FIG. 6 at a flow rate of 30 kg/min., while, on the other hand, coarse silica powders (grain size distribution: 8.4% of $>15\mu$, 39.8% of 15-10$\mu$, 41.8% of 10-5$\mu$ and 10.0% of $<5\mu$) were fed at a rate of 2 kg/min. The rotor was rotated at 1500 r.p.m. to continuously mix the powder with the molten material as well as to form fibers, whereby fibers having an average diameter of 6$\mu$ and tubercular projections were obtained.

The fibers with projections and fibers without projections, both having the same composition and diameter, were respectively mixed as a reinforcing material with cement at a proportion of 65% of cement and 35% of fibers under dry condition. When after adding water to the mixture to form a slurry of a suitable consistency, it was dehydrated and molded. The molded products were then aged at a temperature of 50°C for 10 hours and, further aged within a moist atmosphere for 7 days, they were dried at a temperature of 100°C for 5 hours. Both of the cement plate products thus obtained had a density of 1.60 g/cm³, and the cement plate containing the fibers without projection showed a bending strength of 70-80 kg/cm², while the cement plate containing the fibers with tubercular projections showed that of 160 kg/cm².

EXAMPLE II

A mixture of 96% of a blast furnace slug and 4% of andesite (composition: 36.1% of $SiO_2$, 16.5% of $Al_2O_3$, 40.3% of CaO, 4.9% of MgO, 0.08% of Fe and 1.4% of MnO) was melted by heating it to 1400°C, and fed onto the rotor at a flow rate of 40 kg/min., while, on the other hand, mullite grains (grain distribution: 10.8% of $>15\mu$, 32.1% of 15-10 $\mu$, 35.2% of 10-5 $\mu$, and 21.9% of $<5\mu$) were fed through the annular space 13. The rotor was rotated at 1800 r.p.m. to mix the powder and the molten material and to form fibers, whereby fibers having an average diameter of 5$\mu$ and tubercular projections were obtained. The result of an experiment showed that the knotted fibers thus obtained have a substantially similar reinforcing effect.

FIG. 7 shows another embodiment of the apparatus for preparing reinforcing vitreous knotted fibers, wherein a molten material fed through a feeding member 16 and powder supplied through a hopper 18 are premixed in a gate 19 and the mixture is fed onto a rotor 10 so as to form fibers. With this apparatus shown in FIG. 7, fibers F respectively having tubercular projections K formed by particles therein contained, may be provided.

As means for forming fibers from the mixture of a molten material and powder, means for blasting a jet gas from a nozzle 20 to the mixture flowing down from the gate 19 as shown in FIG. 8 may be employed, whereby knotted fibers as shown in FIG. 1 may be obtained.

FIG. 9 shows a further modification of the apparatus for preparing reinforcing vitreous fibers with projections, wherein numeral 16 designates a feeder for feeding a molten material similar to that described hereinbefore, numeral 20 designates a blasting steam nozzle, numeral 22 designates a nozzle for supplying particles to form projections, numeral 23 is a fiber collector, numeral 24 is an endless belt provided at the bottom of the fiber collector 23, numeral 25 is a suction box, numeral 26 is a burner, numerals 27 and 28 are fans and 29 is a seal roll. The molten material fed through the feeder 16 is transformed into fibers by the jet gas projected from the nozzle 20. At this time, a mixture consisting of powder particles suspended in a binder such as a water-soluble resin, a solvent type resin, an emulsion type resin or latex is blasted from the nozzle 22 to the fibers so as to bond the particles P sporadically onto the surfaces of the fibers. The fibers carrying the particles are blown into the collector 23 through its upper inlet and while they are descending, they are dried by a hot blast supplied by the burner 26 and the fan 27 and the binder on the fibers are solidified. The fibers fall on the belt 24 and are carried out thereby. The fibers thus obtained have at least one projection K bound thereto by the binder B as shown in FIG. 2.

Although the binder may be of single or double fluid type, preferably it is a single fluid hot-blast-hardened type resin so far as the operation and the adhesivity are concerned. Since the fibers with projections are often applied to relatively high alkaline cement concrete products and calcium silicate products, it is preferable to use a resin and a binder of highly alkali resistance when the fibers are applied to such products. Preferred resins include expoxide resin, furan phenol resin, and vinylidene chloride-vinyl chloride copolymer while preferred binders are of relatively high alkali resistant binders such as NBR, SBR and neoprene.

EXAMPLE III

An example for preparing vitreous fibers with projections by using the apparatus shown in FIG. 9 is now described.

10% of alumina powders having a grain size of 5-10 $\mu$ were added to a water-soluble phenol (solid content =60%) and thoroughly suspended by stirring the mixture at a high speed. The suspension thus provided was sprayed onto the fiber surface F through the nozzle 22 and solidified the binder by applying hot air thereto in the fiber collector 23, whereby vitreous fibers having projections as shown in FIG. 2 were prepared.

8% of thus prepared fibers were added to a slurry of $SiO_2$ and CaO so mixed as to have a $SiO_2$: CaO mol ratio of 0.8. The mixture was molded and dehydrated, then subjected to a steam of 8 kg/cm² for 10 hours and dried. The comparison of the strength of the molded product with that of a similar molded product containing similar reinforcing fibers but without projection revealed that the former has about 55% greater bending strength than that the later.

When short vitreous fibers are used in place of the powder and the suspension of such short fibers S in a binder B is sprayed to the surface of vitreous fibers, vitreous fibers having spinous projections as shown in FIG. 3 may be provided.

If a binder not mixed with powder nor short fibers is sprayed onto the fiber surface, vitreous fibers having tubercular projections of the binder B as shown in FIG. 4 may be provided.

FIG. 10 shows still another embodiment of the vitreous fiber preparing apparatus. There are shown a feed tank 30 of a molten material, a bushing 31, a powder feeding nozzle 32, a heater 33 and a fiber winding drum 34. Fiber is pulled out of the tank 30 through the bushing 31 by the winding drum 34, during which it is sprayed by the nozzle 32 with hot powder in the heater 33 so as to provide vitreous fiber having projections of the particles P bonded to the fiber surface.

EXAMPLE IV

An example of preparing such a fiber with the apparatus shown in FIG. 10 will be described.

A molten material heated at a temperature of 1250°C was pulled out of the tank 30 through the bushing 31 at a rate of 1000 m/min, at the same time mullite particles (having a grain distribution of 10.8% of >15µ, 18.9% of 5–10µ, 48.2% of 10–5µ, and 22.1% of <5µ) were sprayed onto the fiber at a rate of 5g/min, whereby vitreous fibers having an average diameter of 12µ and provided with projections were obtained.

The fibers so obtained were cut into pieces 20 mm long. 10% of the short fiber pieces, 38% of kieselguhr 38% of slaked lime and 14% of bentnite were mixed together, then an amount of water equivalent to 10 times of the amount of the mixture was added thereto. The admixture was allowed to swell at 90°C for 2 hours then heated by a saturated steam of 10 kg/cm² for 7 hours and dried to provide a calcium silicate board. The comparison of the strength of the calcium silicate board with that of a similar board reinforced with similar fibers without such projection revealed that the former board has a bending strength of 5.2 kg/cm² while the latter has that of 2.4 kg/cm² at the density of 0.20 g/cm².

While the invention has been particularly shown and described with reference to preferred embodiments thereof, it will be understood by those skilled in the art that the foregoing and other changes in form and details can be made therein without departing from the spirit and scope of the invention.

We claim:

1. A process for making a length of inorganic vitreous fiber for use as a reinforcing element in the matrix of cementituous mixtures wherein said fiber is comprised of a body of a single vitreous fiber and at least one small protrusion formed integrally with said fiber body on the surface thereof comprising simultaneously but separately feeding molten inorganic material to form the body of the vitreous fiber and heat corrosion reistance mineral particles onto a high speed rotating rotor whereby the mineral particles are incorporated into the molten inorganic material and thereafter the incorporated molten inorganic material is released outwardly from the rotor due to the rotating centrifugal force, thereby fibrilating the molten material into a plurality of the vitreous fibers.

2. The process of claim 1 wherein the rotor is a rotor disc.

3. The process of claim 2 wherein the mineral particles are fed through a tube or tubes provided around an axis of the rotor onto the rotor disc while the molten inorganic material is fed from outward of the tube or tubes whereby the both materials are mixed together on the rotor disc.

4. The process of claim 1 wherein at the moment when the incorporated molten inorganic material is released outwardly from the motor, steam or compressed air is blown through the material to thereby fibrilate the molten material into a plurality of vitreous fibers.

5. The process of claim 1 wherein the inorganic material is selected from the group consisting of glass fiber, rock wool and ceramic fiber.

6. The process of claim 1 wherein the heat corrosion resistance material particles are slected from the group consisting of silica, alumina, zirconia and mullite.

7. The process of claim 1 wherein the heat corrosion resistance mineral particles are pre-heated.

* * * * *